(12) United States Patent
Kaminaga

(10) Patent No.: US 9,777,799 B2
(45) Date of Patent: Oct. 3, 2017

(54) TRANSMISSION AND ELECTRIC VEHICLE COMPRISING SAME

(75) Inventor: Seiji Kaminaga, Aichi (JP)

(73) Assignee: Aichi Machine Industry, Co., Ltd., Nagoya (JP)

( * ) Notice: Subject to any disclaimer, the term of this patent is extended or adjusted under 35 U.S.C. 154(b) by 90 days.

(21) Appl. No.: 14/232,096

(22) PCT Filed: Dec. 2, 2011

(86) PCT No.: PCT/JP2011/078503
§ 371 (c)(1),
(2), (4) Date: Jan. 10, 2014

(87) PCT Pub. No.: WO2013/014814
PCT Pub. Date: Jan. 31, 2013

(65) Prior Publication Data
US 2014/0144267 A1   May 29, 2014

(30) Foreign Application Priority Data

Jul. 25, 2011   (JP) .................................. 2011-162653

(51) Int. Cl.
*F16H 59/00*   (2006.01)
*F16H 3/02*    (2006.01)
*F16H 3/089*   (2006.01)
*B60L 11/14*   (2006.01)

(52) U.S. Cl.
CPC ................ *F16H 3/02* (2013.01); *B60L 11/14* (2013.01); *F16H 3/089* (2013.01);
(Continued)

(58) Field of Classification Search
CPC .............. F16H 3/02; B60K 2006/4808; B60K 2006/4825
(Continued)

(56) References Cited

U.S. PATENT DOCUMENTS 5,014,566 A * 5/1991 Kashiwase ...................... 74/331
5,259,260 A   11/1993 Schneider
(Continued)

FOREIGN PATENT DOCUMENTS

GB   2343491 A   5/2000
JP   58-149444 A   9/1983
(Continued)

*Primary Examiner* — Zakaria Elahmadi
(74) *Attorney, Agent, or Firm* — Global IP Counselors, LLP

(57) ABSTRACT

A transmission device includes an output shaft, first and second input shafts, a first gear mechanism, a selective fixing device and a connecting and disconnecting device. The second input shaft is coaxially arranged on an outside periphery of the first input shaft. The first gear mechanism couples the first input shaft and the output shaft with a first gear ratio. The first gear mechanism includes an idle gear mounted on one of the first input shaft and the output shaft. The selective fixing device selectively fixes the idle gear to one of the first input shaft and the output shaft. The second gear mechanism couples the second input shaft and the output shaft with a second gear ratio. The connecting and disconnecting device selectively connects and disconnects the second input shaft to the rotating shaft.

9 Claims, 2 Drawing Sheets

(52) U.S. Cl.
CPC ..... *B60L 2240/12* (2013.01); *B60L 2240/486* (2013.01); *B60L 2240/507* (2013.01); *B60L 2270/145* (2013.01); *F16H 2200/0021* (2013.01); *F16H 2200/0034* (2013.01); *Y02T 10/70* (2013.01); *Y02T 10/7077* (2013.01); *Y02T 10/7258* (2013.01); *Y10T 74/19251* (2015.01)

(58) Field of Classification Search
USPC .......................................... 74/330, 331, 335
See application file for complete search history.

(56) References Cited

U.S. PATENT DOCUMENTS

| | | | |
|---|---|---|---|
| 5,839,989 A * | 11/1998 | Saito | B60W 10/06 477/143 |
| 8,042,418 B2 * | 10/2011 | Matsushita et al. | 74/330 |
| 8,266,977 B2 * | 9/2012 | Mohlin et al. | 74/330 |
| 8,499,656 B2 * | 8/2013 | Ross et al. | 74/330 |
| 8,522,635 B2 * | 9/2013 | Pastorello et al. | 74/335 |
| 2002/0088290 A1 * | 7/2002 | Bowen | 74/335 |
| 2004/0060378 A1 * | 4/2004 | Yamamoto et al. | 74/335 |
| 2008/0000311 A1 * | 1/2008 | Baldwin | 74/331 |
| 2008/0156127 A1 * | 7/2008 | Nicklass et al. | 74/333 |
| 2012/0031230 A1 * | 2/2012 | Guggolz et al. | 74/665 L |

FOREIGN PATENT DOCUMENTS

| | | |
|---|---|---|
| JP | 60-227044 A | 11/1985 |
| JP | 01-146044 U | 10/1989 |
| JP | 04-107565 U | 9/1992 |
| JP | H4-244641 A | 9/1992 |
| JP | 05-332418 A | 12/1993 |

* cited by examiner

TRANSMISSION AND ELECTRIC VEHICLE COMPRISING SAME

CROSS-REFERENCE TO RELATED APPLICATIONS

This application is a U.S. National Stage of International Application No. PCT/JP2011/078503, filed Feb. 12, 2011.

BACKGROUND

Field of the Invention

The present invention relates to a transmission device for achieving a two-speed transmission for low-speed and high-speed, and an electric vehicle comprising same.

Background Information

A conventional transmission device is disclosed in Japanese Laid-Open Utility Model Publication No. 1-146044. In this patent publication, the transmission device, is provided with a low gear supported on an output shaft via a one-way clutch and a high gear that is freely rotatable on the output shaft. The high gear is arranged so as to be selectively fixed to the output shaft by a synchro mechanism. The transmission device automatically achieves a low-speed stage on the basis of the relative rotation between the low gear and the output shaft, and achieves a high-speed stage by fixation of the higher gear to the output shaft by the synchro mechanism.

In the transmission device of such description, a switching operation between the high-speed stage and the low-speed stage can be carried out merely by an operation of the synchro mechanism for fixing or releasing fixation of the high gear to the output shaft, and therefore the number of components can be reduced and the transmission operation can be simplified.

SUMMARY

In recent years, electric-operated vehicles driven by a motor have also seen a heightened need for such transmission devices capable of two-stage transmission as disclosed in Japanese Laid-Open Utility Model Publication No. 1-146044, in order to combine both driving force and maximum vehicle speed.

However, the transmission device disclosed in Japanese Laid-Open Utility Model Publication No. 1-146044 suffers from shortcomings such as the inability to fully ensure the speed reduction ratio needed for reverse travel, because reverse travel is possible only in the high-speed stage, as well as the low efficiency of when kinetic energy during speed reduction is recovered as electric energy.

An object of the present invention is to provide a transmission device of simple configuration with which the necessary power can be outputted irrespective of the direction of rotation of a motor, and with which energy can be efficiently recovered, and the present invention adopts the following means in order to at least partially achieve this object.

A transmission device of the present invention transmits power coming from an electric motor, the transmission device comprising: an output shaft; a first input shaft configured to be coaxial with a rotating shaft of the electric motor and rotate integrally with the rotating shaft; a second input shaft coaxially arranged on an outside periphery of the first input shaft; a first gear mechanism coupling the first input shaft and the output shaft with a first gear ratio, the first gear mechanism including an idle gear mounted on one of the first input shaft and the output shaft; a selective fixing device configured to selectively fix the idle gear to one of the first input shaft and the output shaft; a second gear mechanism coupling the second input shaft and the output shaft with a second gear ratio that is different from the first gear ratio; and a connecting and disconnecting device configured to selectively connect and disconnect the second input shaft to the rotating shaft.

In the transmission device of the present invention, an idle gear which, of the gears of the first gear mechanism by which the first input shaft that is coaxial with the rotating shaft of the electric motor and rotates integrally with the rotating shaft and the output shaft connected to the axle side can be connected, is arranged so as to be able to idle on either the first input shaft or the output shaft is selectively fixed to the first input shaft or to the output shaft by the selective fixing device, thereby making it possible to transmit the power coming from the electric motor to the output shaft with the first gear ratio. Connecting the second input shaft, arranged so as to be externally fitted coaxially onto the first input shaft, to the rotating shaft of the electric motor by the connecting and disconnecting device makes it possible to transmit the power coming from the electric motor to the output shaft with the second gear ratio different from the first gear ratio. Therefore, it is possible to transmit power by selecting whichever gear mechanism is able to output the required power to the output shaft from among the first gear mechanism and the second gear mechanism. As a result, the requisite power can be outputted irrespective of the direction of rotation of the electric motor.

Also, when energy is being recovered as well, selecting the gear mechanism having better energy recovery efficiency from among the first gear mechanism and the second gear mechanism makes it possible to efficiently recover energy. The effects described above can be obtained with a simple configuration because, simply, the switch for power transmission by the first gear mechanism is carried out using the selective fixing device and the switch for power transmission by the second gear mechanism is carried out using the connecting and disconnecting device. It shall be readily understood that when the selective fixing device and the connecting and disconnecting device are actuated at the same time, there will not occur any interruption of power transmission during the switch between the power transmission by the first gear mechanism and the power transmission by the second gear mechanism.

The transmission device of the present invention may be configured so that the first and second gear mechanisms are configured such that the first gear ratio is set to a greater gear ratio than that of the second gear ratio, the idle gear is rotatably arranged on the output shaft, and the selective fixing device is arranged on the output shaft at a position adjacent to the idle gear.

In so doing, the gear diameter of the idle gear can be set to be smaller compared to a case where the idle gear is arranged on the input shaft side with the same gear ratio is being achieved. As a consequence thereof, the device can be rendered more compact.

The present invention may also be configured so that the first and second gear mechanisms are configured such that the first gear ratio is set to a greater gear ratio than that of the second gear ratio, the idle gear is rotatably arranged on the input shaft, and the selective fixing device is arranged on the input shaft at a position adjacent to the idle gear.

In so doing, it is possible to minimize the load of inertia applied to the selective fixing device in comparison to a case where the selective fixing device is arranged on the output shaft. As a consequence thereof, the durability of the selective fixing device can be improved.

The transmission device of the present invention may also be configured so that the selective fixing device is a synchro mechanism, and the connecting and disconnecting device is a friction clutch.

In so doing, costs can be minimized because of the utilization of merely a synchro mechanism and a friction clutch, which are used in conventional manual transmissions.

The essence of an electric vehicle of the present invention resides in the inclusion of the transmission device as set forth in claim 1, and in which the electric vehicle comprises an axle that is mechanically connected to the output shaft.

With the electric vehicle of the present invention, including the transmission device of the present invention of the mode described above, it is possible to exhibit the effects exhibited by the transmission device of the present invention, e.g., the ability to output the requisite power irrespective of the direction of rotation of the electric motor and the ability to obtain, with a simple configuration, a transmission device by which energy can be efficiently recovered. As a consequence thereof, the power consumption of the vehicle can be improved.

DETAILED DESCRIPTION OF THE EMBODIMENTS

Modes for carrying out the present invention shall next be described with reference to the embodiments.

Embodiment 1

Figure 1:
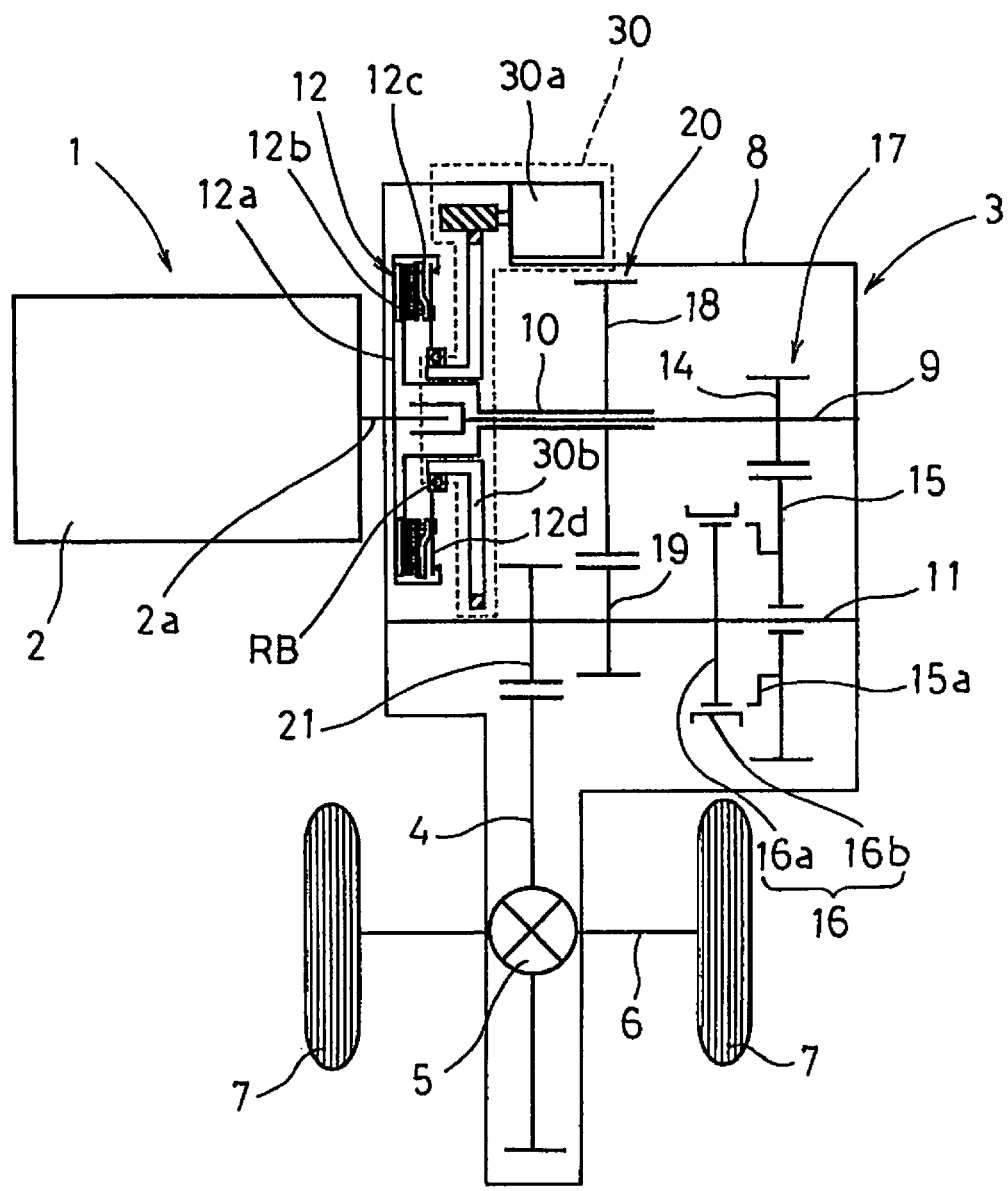
FIG. 1 is an arrangement and configuration schematic view of an electric vehicle provided with a transmission device of a first embodiment.

FIG. 1 is an arrangement and configuration schematic view of an electric vehicle provided with a gear transmission device for achieving a two-stage transmission for low speed and high speed.

An electric vehicle 1 is provided with: a motor 2, which is a power source; a transmission device 3 for shifting the power coming from the motor 2 to two stages for low speed and high speed; a differential device 5 that is connected to the transmission device 3 and transmits the power coming from the transmission device 3 to an axle 6; and wheels 7 that are rotated by the power sent to the axle 6.

The transmission device 3 has input shafts 9, 10 and an output shaft 11 that are rotatably arranged in parallel within a case 8, and a ring gear 4 of the differential device 4 is in meshed engagement with an output gear 21 fixed to the output shaft 11.

The input shafts are constituted of a low-side input shaft 9 and a high-side input shaft 10 that is arranged coaxially with the low-side input shaft 9 and on the outside of the low-side input shaft 9; the low-side input shaft 9 is directly connected to a motor shaft 2a of the motor 2, and the high-side input shaft 10 is coupled to the motor shaft 2a of the motor 2 via a dry clutch 12.

The dry clutch 12 is provided with a flywheel 12a that is rotated by the motor shaft 2a, a clutch disc 12b fixedly mounted by spline fitting or the like to an outer peripheral surface of the motor 2 side of the high-side input shaft 10, a pressure plate 12c that is arranged so as to sandwich the clutch disc 12b with the flywheel 12a on the other side, and a diaphragm spring 12d for urging a spring force in a direction by which the pressure plate 12c is separated from the clutch disc 12b; the motor shaft 2a and the high-side input shaft 10 are connected and disconnected by axially directed movement of the pressure plate 12c by a clutch switch device 30 coupled to the diaphragm spring 12d via a release bearing RB.

The dry clutch 12 is formed so as to be a so-called normally-open type with which the state where the motor shaft 2a and the high-side input shaft 10 are disconnected from each other is normally maintained.

The clutch switch device 30 is constituted of a motor 30a, and a slider 30b that has threaded engagement with a thread section provided to a rotating shaft of the motor 30a and is connected to the release bearing RB, and the rotation of the rotating shaft of the motor 30a is converted to axially directed movement of the slider 30b, thereby moving the pressure plate 12c in the axial direction via the diaphragm spring 12d.

A driving low gear 14 is fixedly provided to the low-side input shaft 9, and a driven low gear 15 constituted of an idle gear capable of idling via a needle bearing with respect to the output shaft 11 is provided to the output shaft 11; the driven low gear 15 is in meshed engagement with the driving low gear 14.

Herein, the driving low gear 15 is of greater diameter than the driving low gear 14 and thus can more readily serve as an idle gear without sizing up, and therefore a more compact device can be achieved in comparison to a case where the driving low gear 14 serves as the idle gear.

A synchro mechanism 16 is arranged at a position adjacent to the driven low gear 15 on the output shaft 11. The synchro mechanism 16 is constituted of a hub 16a fixed by spline fitting to the output shaft 11, and a sleeve 16b that is spline-fitted to a spline formed on an outer peripheral part of the hub 16a and is slidable in the right-hand direction depicted in relation to the hub 16a; the sleeve 16b is configured so as to enable meshed engagement with a clutch gear 15a fixed to the driven low gear 15.

A low-side gear mechanism 17 is constituted of the driving low gear 14 and the driven low gear 15, and fixation of the driven low gear 15 to the output shaft 11 by the synchro mechanism 16 makes it possible to achieve power transmission of the low-speed stage.

A driving high gear 18 is fixedly provided to the high-side input shaft 10, and a driven high gear 19 is fixedly provided to the output shaft 11 side; meshed engagement between the driving high gear 18 and the driven high gear 19 constitutes a high-side gear mechanism 20, which is configured so as to achieve power transmission of the high-speed stage.

The gear ratio of the low-side gear mechanism 17 is set to a greater gear ratio than the gear ratio of the high-side gear mechanism 20.

The operation of the electric vehicle 1 of the embodiment thus configured shall next be described, in particular regarding the shift operation of the transmission device 3.

First, the shift operation of the transmission device 3 at the time of the starting of the electric vehicle 1 shall be described.

During starting, the synchro mechanism 16 is actuated by an actuator (not shown) so that the power of the motor 2 is transmitted to the output shaft 11 via the low-side gear mechanism 17.

That is to say, the sleeve 16b of the synchro mechanism 16 is moved to the right-hand direction depicted from the state illustrated in FIG. 1, the clutch gear 15a and the hub 16a are engaged together via the sleeve 16b, and the driven low gear 15 is fixed to the output shaft 11 via the hub 16a. This achieves the low-speed stage serving as starting. At this time, the clutch switch device 30 is not driven, and thus the dry clutch 12 maintains the disconnected state.

Next, the shift operation for when shifting from the low-speed stage to the high-speed stage shall be described.

When there is an increase in the vehicle speed of the electric vehicle 1 of the embodiment, during travel at the low-speed stage, then a command is issued to the transmission device 3 from a control device (not shown) to shift to the high-speed stage. When the transmission device 3 is commanded to shift to the high-speed stage, the dry clutch 12 is actuated by the clutch switch device 30 so that the power of the motor 2 is transmitted to the output shaft 11 via the high-side gear mechanism 20, and also the synchro mechanism 16 is actuated by the actuator (not shown) so as to release the engagement between the clutch gear 15a and the hub 16a.

That is to say, the slider 30b of the clutch switch device 30 is moved to the left-hand direction depicted to cause the dry clutch 12 to become connected, and the sleeve 16b of the synchro mechanism 16 is moved to the left-hand direction depicted to release the engagement, via the sleeve 16b, between the hub 16a and the clutch gear 15a. This achieves the high-speed stage.

Herein, an interruption of the power transmission is prevented from taking place during the switch from the low-speed stage to the high-speed stage by simultaneously carrying out (while overlapping) the operation to connect the dry clutch 12 by the clutch switch device 30 and the release operation of the synchro mechanism 16 by the actuator (not shown).

Finally, the shift operation for when shifting from the high-speed stage to the low-speed stage shall be described.

A command is issued from the control device (not shown) to the transmission device (3) to shift to the low-speed stage when the vehicle speed of the electric vehicle 1 of the embodiment during travel at the high-speed stage is being reduced or when a need to re-accelerate arises. When a command to shift to the low-speed stage is issued to the transmission device 3, the transmission device 3 is controlled to as to begin operating opposite to during the previously described switch from the low-speed stage to the high-speed stage.

That is to say, the slider 30b of the clutch switch device 30 is moved to the right-hand direction depicted to cause the dry clutch 12 to become disconnected, and the sleeve 16b of the synchro mechanism 16 is moved to the right-hand direction depicted to engage the hub 16a and the clutch gear 15a together via the sleeve 16b. This achieves the low-speed stage.

Herein, similarly with respect to during the shift from the low-speed stage to the high-speed stage, an interruption of the power transmission is prevented from taking place during the switch from the high-speed stage to the low-speed stage by simultaneously carrying out (while overlapping) the operation to disconnect the dry clutch 12 by the clutch switch device 30 and the engagement operation of the synchro mechanism 16 by the actuator (not shown).

According to the transmission device of the embodiment described above, the low-speed stage is constituted of the low-side input shaft 9 that is directly connected to the motor shaft 2a, the driving low gear 14 fixed to the low-side input shaft 9, the driven low gear 15 idly arranged on the output shaft 11, and the synchro mechanism 16 for selectively fixing the driven low gear 15 to the output shaft 11, and the high-speed stage is constituted of the high-side input shaft 10 arranged by being externally fitted to the low-side input shaft 9, the dry clutch 12 for selecting connecting the high-side input shaft 10 and the motor shaft 2a of the motor 2 together, the driving high gear 18 fixed to the high-side input shaft 10, and the driven high gear 19 fixed to the output shaft 11.

That is to say, having the shift to the low-speed stage be the switch by the synchro mechanism 16 and having the shift to the high-speed stage be the switch by the dry clutch 12 means that it is readily possible to ensure a configuration by which the power required can be transmitted to the output shaft 11 irrespective of the direction of rotation of the motor shaft 2a of the motor 2. It is moreover possible to efficiently recover energy, by selecting the low-speed stage for during energy recovery. It shall also be readily understood that simultaneously carrying out the switch of the synchro mechanism 16 and the switch of the dry clutch 12 prevents any interruption of power transmission during shifting from taking place.

Embodiment 2

An electric vehicle 100 equipped with a transmission device 103 of a second embodiment of the present invention shall next be described.

Figure 2:
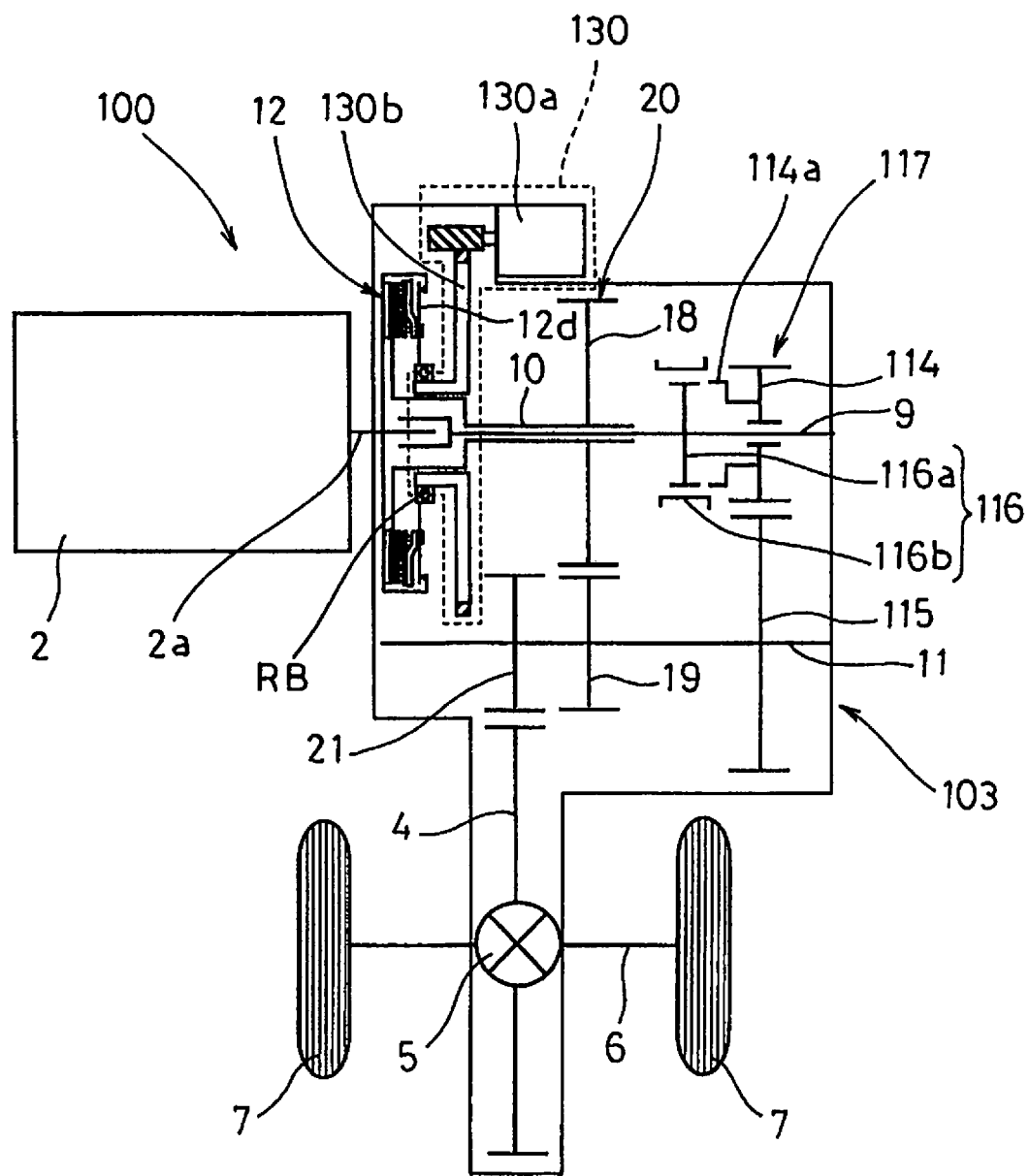
FIG. 2 is an arrangement and configuration schematic view of an electric vehicle provided with a transmission device of a second embodiment.

FIG. 2 is a schematic configuration diagram of the electric vehicle equipped with the transmission device 103 of the second embodiment.

The electric vehicle 100 of the transmission device 103 of the second embodiment is given the same configuration as that of the electric vehicle 1 provided with the transmission device 3 of the first embodiment, except in that the low-side gear mechanism 17 is changed to a low-side gear mechanism 117, and in that the synchro mechanism 16 is changed to a synchro mechanism 116. As such, like reference numerals are assigned to parts of the electric vehicle 100 of the second embodiment that are of like configuration to that of the electric vehicle 1 of the first embodiment, and a description thereof is omitted.

In the transmission device 103 of the second embodiment, as is depicted, a driving low gear 114 is idly arranged on the low-side input shaft 9 and a driven low gear 115 is fixed onto the output shaft 11; on the low-side input shaft 9, the synchro mechanism 116 is disposed adjacently on the left-hand side depicted of the driving low gear 114.

A clutch gear 114a is fixedly provided to the driving low gear 114, and moving a sleeve 116b of the synchro mechanism 16 to the right-hand side depicted causes the clutch gear 114a and a hub 116a of the synchro mechanism 116 to become engaged with each other via the sleeve 116b. This fixes the driving low gear 114 to the low-side input shaft 9 and achieves the low-speed stage.

According to the transmission device 103 of the second embodiment described above, the effects are similar to those of the transmission device 3 of the first embodiment, i.e., it is readily possible to ensure a configuration by which the power required can be transmitted to the output shaft 11 irrespective of the direction of rotation of the motor shaft 2a of the motor 2, and also possible to efficiently recover energy, by selecting the low-speed stage for during energy recovery. It shall also be readily understood that the effect where simultaneously carrying out the switch of the synchro mechanism 116 and the switch of the dry clutch 12 prevents any interruption of power transmission during shifting from taking place is also exhibited.

It is also possible to minimize the load of inertia applied to the synchro mechanism 116, because the synchro mechanism is arranged not only the output shaft 11 but rather on the low-side input shaft 9. As a consequence thereof, it is possible to improve the durability of the synchro mechanism 116.

With the transmission devices 3 and 103 of the embodiments described above, the switch to the low-speed stage was made by actuating the synchro mechanisms 16 and 116 and the switch to the high-speed stage was made by actuating the dry clutch 12, but, conversely, the configuration may be such that the switch to the low-speed stage is made by actuating the dry clutch and the switch to the high-speed stage is made by actuating the synchro mechanism.

The invention claimed is:

1. A transmission device for transmitting power coming from an electric motor, the transmission device comprising:
   an output shaft;
   a first input shaft directly connected to a rotating shaft of the electric motor so as to be coaxial with the motor and so as to rotate integrally with the rotating shaft;
   a second input shaft coaxially arranged on an outside periphery of the first input shaft;
   a first gear mechanism coupling the first input shaft and the output shaft with a first gear ratio, the first gear mechanism including an idle gear mounted on one of the first input shaft and the output shaft;
   a selective fixing device configured to selectively fix the idle one of the first input shaft and the output shaft;
   a second gear mechanism coupling the second input shaft and the output shaft with a second gear ratio that is different from the first gear ratio;
   a connecting and disconnecting device configured to selectively connect and disconnect the second input shaft and the rotating shaft; and
   a control device programmed to control the selective fixing device to fix the idle gear to one of the first input shaft and the output shaft, while simultaneously controlling the connecting and disconnecting device to release the connection of the rotating shaft and the second input shaft, when a first transmission command is issued.

2. The transmission device as set forth in claim 1, wherein the first and second gear mechanisms are configured such that the first gear ratio is set to a greater gear ratio than that of the second gear ratio,
   the idle gear is rotatably arranged on the output shaft, and
   the selective fixing device is arranged on the output shaft at a position-adjacent to the idle gear.

3. The transmission device as set forth in claim 1, wherein the first and second gear mechanisms are configured such that the first gear ratio is set to a greater gear ratio than that of the second gear ratio,
   the idle gear is rotatably arranged on the input shaft, and
   the selective fixing device is arranged on the input shaft at a position-adjacent to the idle gear.

4. The transmission device as set forth in claim 1, wherein the selective fixing device is a synchro mechanism, and the connecting and disconnecting device is a friction clutch.

5. The transmission device as set forth in claim 2, wherein the selective fixing device is a synchro mechanism, and the connecting and disconnecting device is a friction clutch.

6. The transmission device as set forth in claim 3, wherein the selective fixing device is a synchro mechanism, and the connecting and disconnecting device is a friction clutch.

7. An electric vehicle including the transmission device as set forth in claim 1, the electric vehicle comprising:
   an axle mechanically connected to the output shaft of the transmission device.

8. The transmission device as set forth in claim 1, wherein the control device is further programmed to control the selective fixing device to release the fixing of the idle gear from the first input shaft or from the output shaft, while simultaneously controlling the connecting and disconnecting device to connect the rotating shaft and the second input shaft, when a second transmission command is issued.

9. A transmission device for transmitting power coming from an electric motor, the transmission device comprising:
   an output shaft;
   a first input shaft directly connected to a rotating shaft of the electric motor so as to be coaxial with the motor and so as to rotate integrally with the rotating shaft;
   a second input shaft coaxially arranged on an outside periphery of the first input shaft;
   a first gear mechanism coupling the first input shaft and the output shaft with a first gear ratio, the first gear mechanism including an idle gear mounted on one of the first input shaft and the output shaft;
   a selective fixing device configured to selectively fix the idle one of the first input shaft and the output shaft;
   a second gear mechanism coupling the second input shaft and the output shaft with a second gear ratio that is different from the first gear ratio;
   a connecting and disconnecting device configured to selectively connect and disconnect the second input shaft and the rotating shaft; and
   a control device programmed to control the selective fixing device to release the fixing of the idle gear from the first input shaft or from the output shaft, while simultaneously controlling the connecting and disconnecting device to connect the rotating shaft and the second input shaft, when a transmission command is issued.

* * * * *